3,297,250
HEATING AND COOLING TEMPERATURE CONTROL FOR A PLURALITY OF ZONES

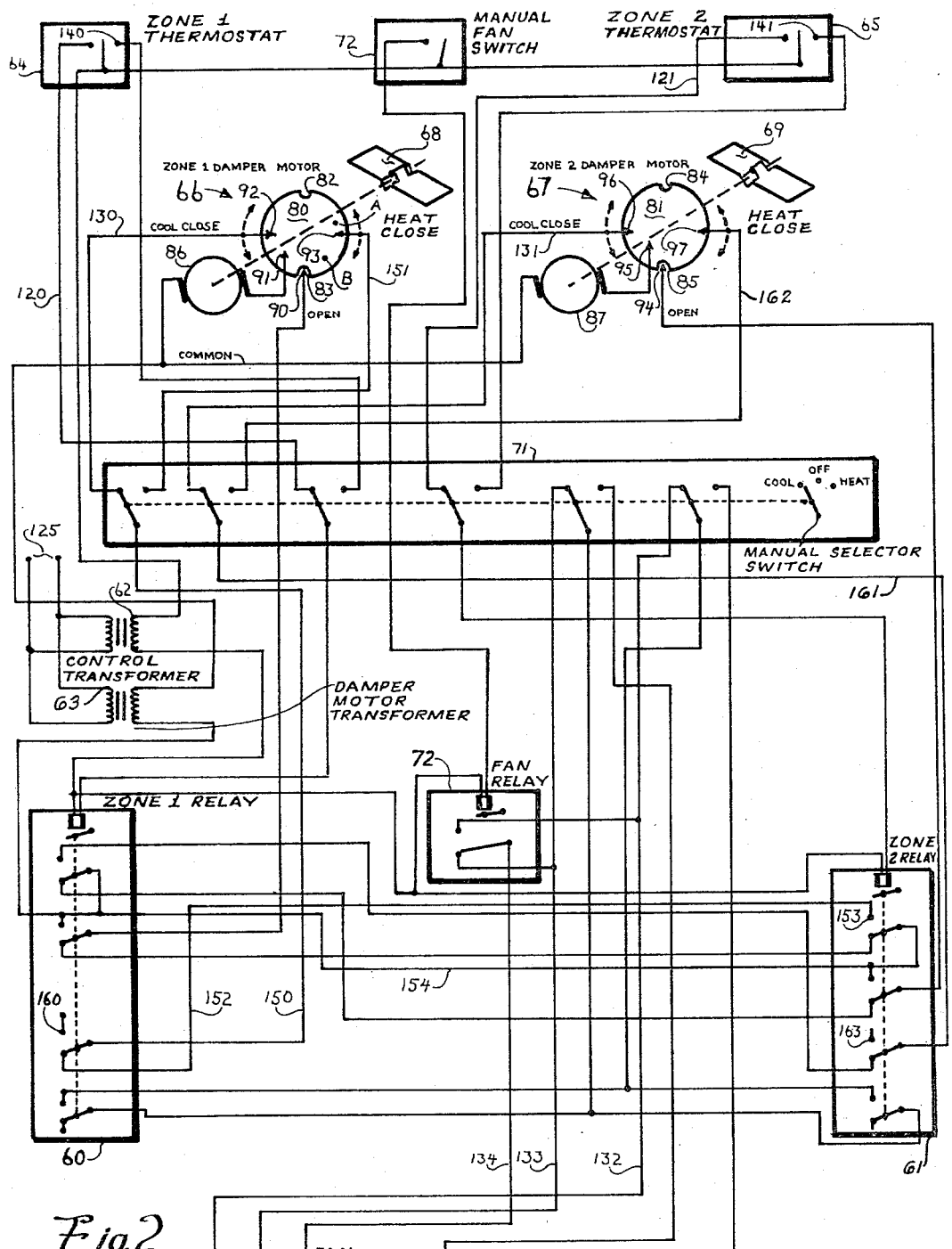
Fig 2
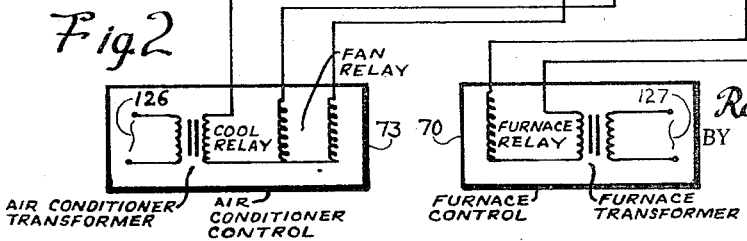
INVENTOR.
Randolph P. Capps
BY
R. B. Olive
Attorney

Randolph P. Capps, Lynchburg, Va., assignor to Multi-Zoner, Inc., Lynchburg, Va., a corporation of Virginia
Filed Mar. 16, 1964, Ser. No. 352,024
12 Claims. (Cl. 236—1)

This invention relates to a temperature control system for controlling heating and cooling in a plurality of zones. The invention is particularly concerned with a zone temperature control system which allows the heating or cooling medium to circulate in the zones after the zones have become satisfied so as to eliminate the need for dump zones, by-pass ducts and the like.

The invention finds special application in forced air heating and cooling systems and it will be explained in connection with forced air systems though it should be pointed out that in a broad sense the invention described and claimed herein has application in heating and cooling systems using mediums other than air such as hot water and steam. Considering first the problem of zone heating with hot air it is known that many modern structures, particularly ranch and split level type homes, are difficult to balance with the type of damper controls conventionally provided. Rooms are frequently found to be too hot or too cold. It is also known that conventional damper controls for hot air systems require the employment of dump zones or by-pass ducts for handling the residual hot air that accumulates in the plenum chamber area after all zones are satisfied since conventional damper controls cause the dampers to close off ducts leading to the zones after the zones are all satisfied. That is, conventional controls make no provision for maintaining any kind of circulation whether forced or not forced after the thermostats have all become satisfied. As a further aspect of conventional controls it is known that if a large and small zone are being controlled together and if only the small zone is demanding heat it is desirable to bypass some of the heat to the large zone in order to avoid excessive duct velocities and noise problems in the small zone. Cooling control exhibits a somewhat similar requirement not met by conventional controls in sometimes requiring a bypass of cooling air in order to maintain a minimum air flow over the cooling coil. Because the conventional damper actuator, whether for heating or cooling usually operates two or more dampers and usually holds each damper full open or full closed there is very little flexibility in the system for overcoming these various shortcomings. Consequently, there has been a great need for an inexpensive temperature control system for multizone installations both for heating and cooling purposes.

The present invention represents what is believed to be a basically improved temperature control system and which adapts itself to both heating and cooling control. In particular, the system of the invention uses a separate thermostat and damper actuator for each zone. When all zones demand heat, the actuators cause each damper to open and as each zone becomes satisfied its damper closes. When all zones are satisfied, all dampers open thereby allowing residual heat to circulate to the zones. If a single zone demands heat, its damper actuator only is open and the system operates to direct all heat to that zone. However, by means of an adjustable contact on each damper actuator, a very simple means is provided for adjusting the closed position such that if a small zone is demanding heat by itself, the closed position of a large zone damper can be adjusted to be partly open and thereby accept some of the heat to avoid excessive velocities in the small zone.

The system of the invention adapts itself to cooling control and to essentially the same type of damper action as that described above for heating control. A separate adjustable contact on each damper actuator controls the cooling stop position independently of the heating stop position. By presetting the cooling and heating stop positions according to the particular zone requirements as later described, a change from heating to cooling control or vice-versa requires positioning only one manual switch.

It is therefore an object of the present invention to provide an improved temperature control system for application to a plurality of zones.

It is another object to provide a temperature control system which does not require dump zones, by-pass ducts and the like for handling residual heat after all zones are satisfied.

It is another object to provide an inexpensive temperature control system which utilizes an individual thermostat and an individual damper actuator for each zone thereby eliminating the need for a plurality of zones to depend on positioning a single actuator.

It is another object to provide a temperature control system having a simple means for regulating the damper actuator closed position.

It is another object to provide a temperature control system for a plurality of zones in which the final act of control after all zones are satisfied is that of bringing all dampers to open position.

These and further objects will appear as the description proceeds. For a more thorough understanding of the invention reference is now made to the follow specification and the drawings in which:

FIGURE 2 is a more detailed schematic diagram of a two zone installation employing the invention for heating and cooling control.

Figure 3:
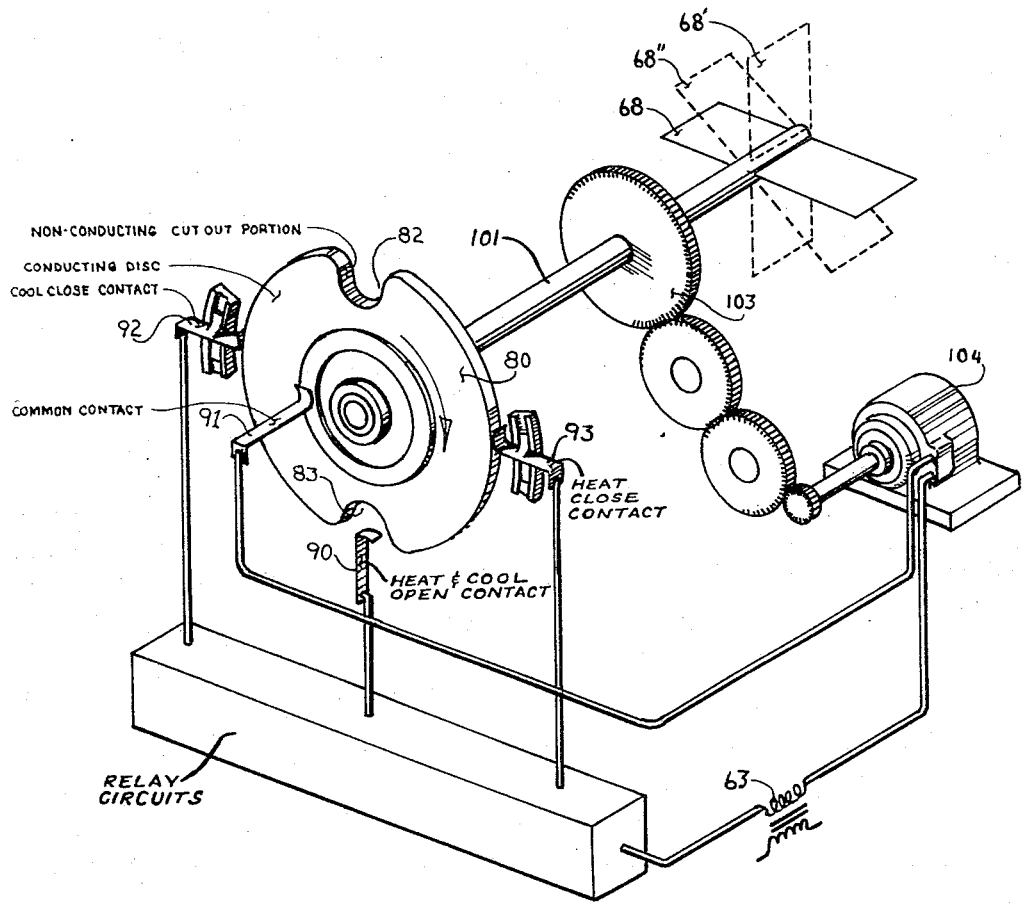

FIGURE 3 schematically represents a preferred actuator.

Figure 4:
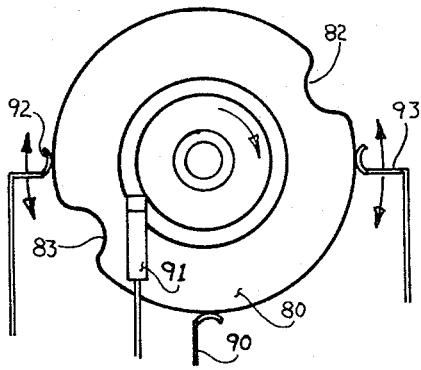
Figure 5:
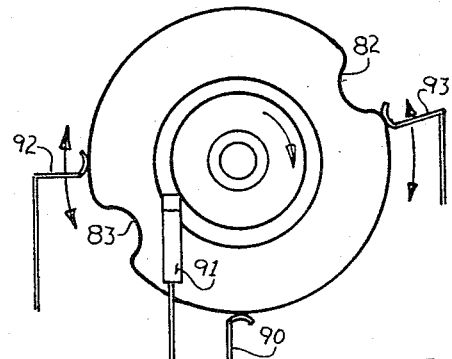

FIGURES 4 and 5 schematically represent different positions of the actuator.

Figure 1:
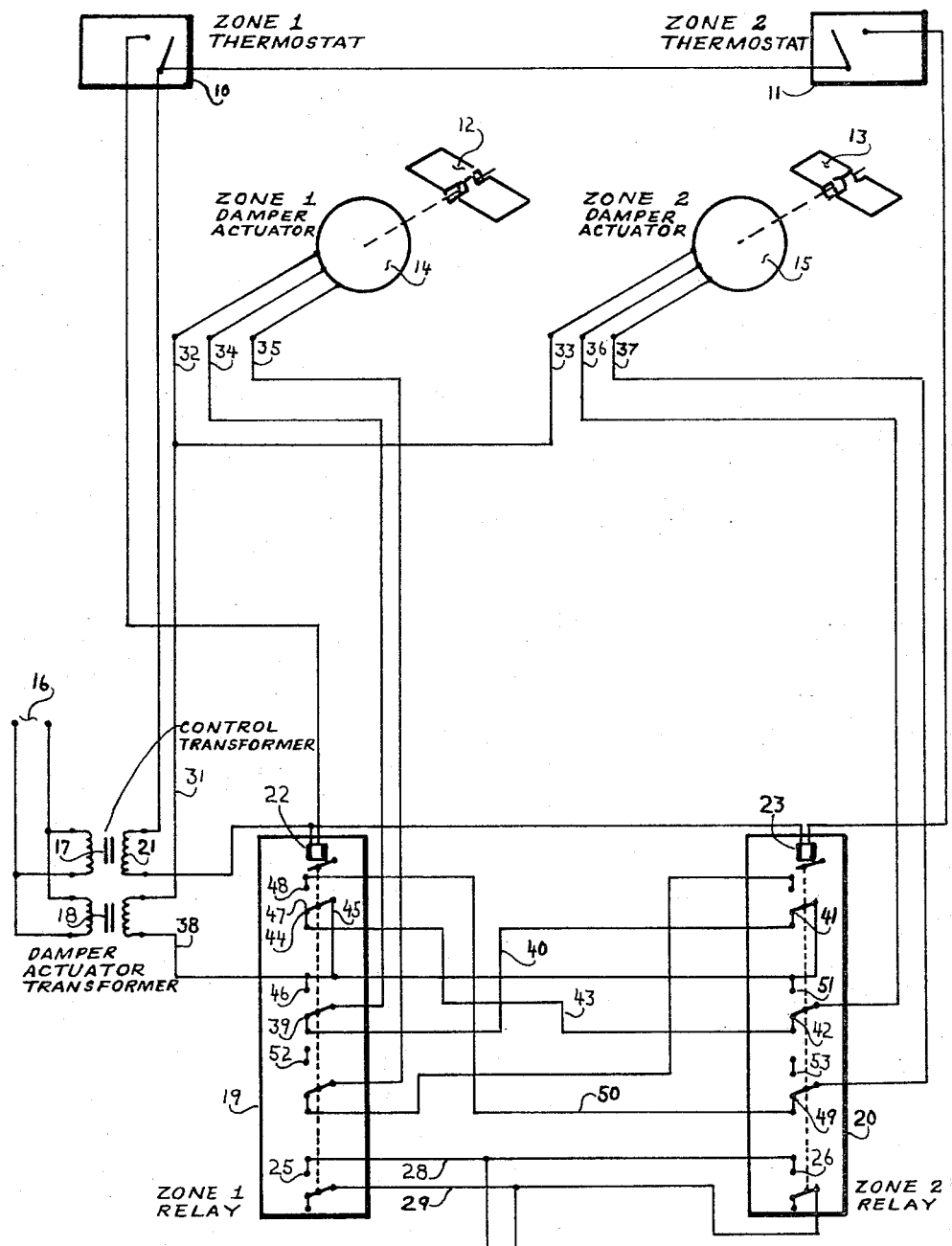
FIGURE 1 is a schematic diagram of a basic two zone installation employing the invention for heating control.

Referring to FIGURE 1, the system is shown applied in its simplest form to a two zone heating temperature control system. A more complex application will be dealt with in connection with FIGURE 2. The zones are referred to for purpose of explanation as Zone 1 and Zone 2. Zone 1 is provided with a conventional single pole, single throw type thermostat 10 and Zone 2 with a similar thermostat 11. Heat flow to each zone is governed by a separate damper schematically represented by 12 for Zone 1 and 13 for Zone 2 and the respective dampers are controlled by suitable damper actuators generally represented at 14, 15. As will be pointed out later in the description, damper actuators 14, 15 for purposes of the system of FIGURE 1 may partake of being unidirectional motors, reversible motors, spring return actuators or other types of two wire or three wire operated damper actuators. Typical damper actuators are those sold under the mark "Tradeline" by Minneapolisc Honeywell Regulator Company of Minneapolis, Minnesota.

Alternating current power from a suitable source represented at 16 is employed to energize the primary windings of a control transformer 17 and a damper actuator transformer 18. While a single transformer might be employed, it has been found that most operating, power, current and electrical code requirements are best met by using separate control and actuator transformers.

Each thermostat of FIGURE 1 controls a relay, which relays in turn determine when the damper actuators and furnace burner are energized. It will be observed that relays 19, 20 are of the four pole, double throw type and that when thermostat 10 is closed the secondary winding 21 of control transformer 17 is placed in series with the relay coil 22 of relay 19. Similarly, when thermostat 11 is closed, the secondary winding 21 of control transformer 17 is placed in series with relay coil 23 of relay 20. Thus, relays 19, 20 may be closed separately and independently or simultaneously depending on whether Zones 1 and 2 both call for heat or only one calls for heat. It should also be noted that relays 19 and 20 are shown in FIGURE 1 positioned as they would be when both coils 22 and 23 are deenergized. The relay position of FIGURE 1 as shown is thus the position occupied whenever both zones are satisfied.

Before proceeding to the damper actuator control with which the invention is primarily concerned, it should be noted that the appropriate furnace valve or relay control represented at 24 is energized when either coil 22 or coil 23 is energized. For example, if contact 25 makes or if contact 26 makes, furnace control 24 will complete a circuit through wires 27, 28, 29, 30.

As previously mentioned damper actuators 14, 15 may be two wire or three wire damper actuator devices. In either case wire 31 is employed as the ground wire one branch of which 32 connects to actuator 14 and another branch of which 33 connects to actuator 15. Where a three wire device, as for example a conventional reversible motor, is employed wire 34 represents the path through which current flows to cause actuator 14 to rotate to its damper open stop whereas wire 35 represents the path through which current flows to cause actuator 14 to rotate to its damper close stop. Similarly, wire 36 represents the damper open stop current path and wire 37 represents the damper close stop current path for actuator 15. Where a spring return to deenergized open damper position, two wire type, damper actuator is employed, wires 34 and 36 may be eliminated and relays 19, 20 may be of the three pole, double throw type, since in such case it is necessary to establish current paths through wires 35 and 37 for damper closing purposes only.

The remaining description is based on a three wire actuator.

Taking the thermostat and relay position as shown in FIGURE 1, there is represented the situation of Zone 1 and Zone 2 both being satisfied thereby maintaining relays 19, 20 deenergized. However, even though relays 19, 20 are deenergized, it will be noticed that voltage potentials and current paths are established which tend to hold dampers 12, 13 open. For example, wire 38, on the potential side of transformer 18, is connected to wire 34 (current through which tends to hold damper 12 open) which in turn connects to contact 39, wire 40 and contact 41. Wire 38 is also connected to wire 36 (current through which tends to hold damper 13 open) through contact 42, wire 43, contact 44 and wire 45. Thus, wires 34, 36 and 38 are all at the same potential with respect to the common or ground wire 31 whenever relays 19, 20 are deenergized.

From the foregoing, those familiar with the problem of dissipating residual heat will recognize immediately that by causing dampers 12, 13 to assume open rather than the usual closed positions when their respective zones are satisfied, the residual heat can flow directly from the plenum chamber (not shown), where it normally collects to the zones and be dissipated in the zones thereby eliminating the need for a dump zone, by-pass duct or the like.

Having considered the state of the system where both zones are satisfied, consideration is next given to the situation where only one zone demands heat. As an example, assume Zone 1 demands heat as would be indicated by thermostat 10 closing and relay coil 22 being energized. Wire 38 will now connect with wire 34 through contact 46 and thus wire 34 will remain energized which insures that damper 12 will remain open. At the same time switch arm 47 will move off contact 44 and establish a new connection with contact 48 resulting in wire 36 being deenergized and wire 37 energized (current through which tends to close damper 13) through a new current path between wire 37 and wire 38 that includes contact 49, wire 50 and contact 48. Thus as long as thermostat 10 stays closed and thermostat 11 open, damper 12 will remain open and damper 13 will remain closed. However as soon as thermostat 10 is satisfied and opens so as to deenergize relay coil 22, the system will reestablish a potential between wires 34, 36 and wire 38 thus insuring that the final position of both damper 12 and damper 13 will be open.

A further situation is for both zones to demand heat simultaneously which would correspond to both thermostats 10, 11 being closed and both coils 22, 23 being energized. In this situation, wire 38 energizes wire 34 through contact 46 and further energizes wire 36 through contact 51. It can also be noticed from FIGURE 1 that energization of coil 22 connects wire 35 to a dead contact 52 and that energization of coil 23 connects wire 37 to a dead contact 53. Thus, when both zones demand heat, only those paths which tend to open dampers are made operative.

Viewed from the existence of current paths, it can be said that the system of FIGURE 1 energizes or makes operative only those paths which tend to cause the dampers to open when both zones are satisfied. When only one zone is demanding heat, the system makes operative those paths which tend to cause the damper to open in the zone demanding heat and the damper to close in the zone not demanding heat. When both zones demand heat, the system makes operative those paths which tend to cause all dampers to open. Irrespective of whether only one or both zones demand heat, the final act after all zones are satisfied is to restore all dampers to the open position thus insuring an air path for the residual heat. From the viewpoint of the arrangement of the relays, the energization of a relay in one zone will interrupt the path tending to keep the damper open in the opposite zone since such paths are completed through the relay so energized. At the same time the energized relay in one zone interrupts the path tending to keep open the damper in the opposite zone it establishes a new path tending to keep closed the damper in the opposite zone. When both relays are energized, current paths which tend to open the dampers are established through each respective relay for its respective zone without having to go through the relay of the opposite zone.

While only two actuators are shown in FIGURE 1, it will be apparent that where a zone can utilize say two actuators, such actuators could be connected electrically parallel so as to respond together.

Referring next to FIGURE 2, there is illustrated a system which applies the basic principles of the FIGURE 1 circuit but in a system in which both heating and cooling is involved. In FIGURE 2, relay 60 compares to relay 19 of FIGURE 1; relay 61 compares to relay 20; transformer 62 compares to transformer 17; transformer 63 compares to transformer 18; thermostat 64 of FIGURE 2 compares to thermostat 10 of FIGURE 1 except that since both heating and cooling are being controlled thermostat 64 is of a single pole, double throw type; thermostat 65 compares in a similar way to thermostat 11; damper motor 66 compares to damper actuator 14; damper motor 67 compares to damper actuator 15; schematically represented dampers 68, 69 compare respectively to dampers 12, 13 and furnace control 70 of FIGURE 2 compares to furnace control 24 of FIGURE 1.

The system of FIGURE 2 is further provided with a manually positioned 6 pole, double-throw selector switch 71 which enables the system to be shut off, set for heat control or set for cool control. There is further provided a manual fan switch 72 which enables the fan to be operated independently and tied into the system is air conditioner control 73 to be referred to later in the description.

As has already been mentioned one of the objects of the invention is to provide a simple means for adjusting each zone damper control such that the closed position of each damper can be made to vary by a substantial angle and when once set will always return when closed to the adjusted position. For example, if Zone 2 is a small zone and Zone 1 is a large zone, it may be desirable for the Zone 1 damper (represented by 12 in FIGURE 1 and by 68 in FIGURE 2) to reside several degrees off vertical when in its furtherest closed position in order to reduce the Zone 2 duct velocity when only Zone 2 is demanding heat. From a cooling viewpoint, a different requirement might prevail in order to maintain some desirable minimum cubic feet per minute volume over the cooling coils when only Zone 2 is demanding cooling. In order to accomplish this adjustable feature for both heating and cooling the invention preferably employs a damper motor of the type schematically illustrated in FIGURES 2 and 3 described and claimed in more detail in my co-pending application Serial No. 352,187, filed March 16, 1964.

In FIGURE 2, 80 and 81 represent conducting discs having cut-out portions at 82, 83 on disc 80 and at 84, 85 on disc 81. Each respective disc 80, 81 is arranged to be driven by its own motor represented at 86, 87. Each disc is preferably mounted so that the disc position corresponds to the position of the respective dampers 68, 69. Disc 80 makes contact with four wiper contacts 90, 91, 92, 93 and disc 81 makes contact with four wiper contacts 94, 95, 96, 97. Contacts 92, 93 on disc 80 and contacts 96, 97 on disc 81 are adjustable around the center of each respective disc which enables the closed positions on both heating and cooling to be adjusted for the purposes previously explained.

A preferred damper motor arrangement for the system of FIGURE 2 is schematically illustrated in more detail by FIGURE 3. Using damper motor 66 as an example the conducting disc 80 is arranged to be driven by a shaft 101 from which it is suitably insulated by means not shown and which also mounts the damper 68. That is, the preferred arrangement is for damper 68 and disc 80 to rotate together. Shaft 101 is driven through a suitable gear train 103 driven by a unidirectional damper motor 104 (which compares to motor 86 of FIGURE 2.) The gear train is desirable since conventional damper motors are of relatively high speed. The previously mentioned wiper contacts namely the common contact 91, the cool close contact 92, the heat close contact 93 and the heat and cool open contact 90 are arranged around the periphery of the disc. Current flow between the common contact 91 and the close and open contacts 92, 93, 90 is made through the conducting disc 80. Contact 91, the common or ground contact, remains in permanent contact with the conducting disc 80. However, contacts 90, 92 and 93 contact disc 80 only when they are not residing in one of the non-conducting cut-out portions 82, 83.

Considering a damper motor arrangement such as illustrated by FIGURE 3 it can be seen that anytime the damper opening contact 90 is energized and is not in one of the non-conducting cut-out portions, illustrated by FIGURE 4, the motor 104 will be energized by reason of current flowing through the disc 80 between the contact 90 and the common contact 91 and the motor will, through gear train 103, cause disc 80 to rotate until contact 90 reaches a cut-out portion as in FIGURE 3. Thus for both heating and cooling control, contacts 91 and 90 can be used for returning the damper to open position. In a heating control circuit such as illustrated by FIGURE 1, if the wire 34, for example, is connected to a contact comparable to contact 90 and wire 32 to a contact comparable to contact 91, it will be readily seen that a damper control of the type illustrated by FIGURE 3 can be used for the damper actuator 14 in FIGURE 1 so far as damper opening is concerned.

Considering next the cool close contact 92 and the heat close contact 93 of FIGURE 3, it should be appreciated that a contact such as contact 92 is employed only for cooling control and a contact such as contact 93 is employed only for heating control. Assume, for example, that we are concerned with heating control, it will be seen that if contact 93 is energized at a time when it does not reside in one of the cut-out portions 82, 83 as in FIGURE 4, current will flow between contact 93 and contact 91. Motor 104 will be energized, disc 80 will rotate and damper 68 will rotate until contact 93 reaches one of the cut-out portions such as at 82 of FIGURE 4 which breaks the circuit through disc 80 and brings the damper to the closed position 68'.

Continuing consideration of heating control, it will also be observed in FIGURE 3 that if disc 80 rotates when driven by motor 104 in the direction indicated, the point at which contact 93 reaches a cut-out portion can be regulated by rotating contact 93 around the center of disc 80. For example, if contact 93 is rotated counter-clockwise to a position such as illustrated by FIGURE 5, the damper 68 will reach its closed position earlier as represented at 68" and its "closed" position will actually be a partially open position. In the same sense contact 92 may be rotated to vary the "closed" position of the damper when cooling control is effected.

The discussion next turns to the relay circuitry of FIGURE 2 and an explanation of how the contacts 90, 92 and 93 of damper motor 66 and contacts 94, 96 and 97 of damper motor 67 are energized in response to thermostats 64, 65. Of particular interest in connection with FIGURE 2 as compared to FIGURE 1 is the fact that the basic circuitry of FIGURE 1 is utilized in the FIGURE 2 circuit for both heating and cooling control. In both applications, unlike conventional controls, all dampers are arranged to return to open positions when the zones are satisfied. Additionally, the closed position of each damper can be regulated so that the damper assumes one closed position, say full closed, for heating and another, say partially closed, for cooling and once established the damper will return, when directed to close, to the particular established position.

The circuit of FIGURE 2 is energized by suitable sources of power applied at 125, 126, 127. If heating control is desired manual switch 71 is switched to "heat" position which acts to disconnect thermostat wires 120, 121, cool close contact wires 130, 131, and air conditioner control wires 132, 133 from switch 71 so as to make inoperative cool close contacts 92 and 96 and air conditioner control 73. With switch 71 on "heat," relay 60 depends for its energization on thermostat 64 closing on the contact 140 and relay 61 depends for its energization on thermostat 65 closing on the contact 141. Furthermore, it will be seen that contact 93 which passes current to close damper 68 depends for its operation on (a) the contact being physically positioned on a conducting portion of disc 80, (b) on thermostat 64 being open and (c) on thermostat 65 closing on the contact 141. Similarly, contact 97 which passes current to close damper 69 depends on (a) being physically positioned on a conducting portion of disc 80, (b) on thermostat 65 being open and (c) on thermostat 64 closing on contact 140.

These last mentioned circuits can be traced for example by noting that when thermostat 64 is open, relay 60 is de-energized and wire 150, which connects to contact 93 through wire 151, is connected to wire 152 which terminates at open contact 153. However, if thermostat 65 is closed on contact 141, relay 61 will be energized and consequently wire 152 will be connected to the damper motor transformer 63 through wire 154. Thus, if contact 93 is physically resting on a conducting portion of disc 80 and thermostat 65 closes, damper 68 will be caused to rotate until contact 93 reaches a non-conducting cut-out portion 82 or 83 of disc 80. The amount of such rotation of damper 68 and consequently the degree to which damper 68 is closed can be regulated by the position of contact 93 on disc 80. That is, assuming motor 86 drives disc 80 clockwise as viewed in FIGURE 2, if contact 93 is rotated counterclockwise to say position A (FIGURE 2), damper 68 will close to a lesser degree than if contact 93 were rotated clockwise to position B.

The positions of disc 80 and 81 in FIGURE 2 represent their respective positions when both dampers 68 and 69 are open at which time contacts 90 and 94 are in their respective cut-out non-conducting portions 83, 85 of discs 80, 81. The FIGURE 2 representation also depicts both thermostats in non-operative "satisfied" positions. To consider another situation, if both thermostats close and demand heat at the same time, the dampers 68, 69 will remain open. This can be seen by noting that when relay 60 is closed, wire 150, which connects to wire 151 and heat close contact 93, terminates on an open contact 160 and when relay 61 is closed, wire 161, which connects to wire 162 and heat close contact 97, terminates on an open contact 163. At the same time it should be noted that contacts 90 and 94 are energized and consequently discs 80 and 81 will tend to maintain a position or rotate to a position which keeps or places, as the case may be, contacts 90 and 94 in the non-conducting cutout portions of the conducting discs 80, 81.

One of the most important advantages of the circuit of FIGURE 2 is found in the fact that a cooling system control is established merely by switching switch 71 to "cool" position and positioning cool close contacts 96, 92 to correspond to the degree of closed damper positions required. That is, contacts 96, 92 are independently positionable in the same sense as contacts 93, 97. By tracing circuits similar to those previously identified for heating control, it will also be seen that essentially the same operating characteristics can be obtained for cooling control. For example, so long as both zones are satisfied the contacts 94, 95 will seek the non-conducting portions of discs 80, 81 and retain dampers 68, 69 in open positions. When a single zone demands cooling, the damper in the zone not demanding cooling will remain closed. Furthermore, at the conclusion of a cooling demand by either or both zones, the dampers 68, 69 will be left in open positions.

Considering the type actuators that may be employed, it can be observed that in the conventional two wire damper actuator such as a spring return type, an "electrical means" such as a solenoid or motor can be arranged to cause the damper to close and some other means which can be mechanical, such as a spring, can cause the damper to open. In a three wire damper actuator, such as multi-field reversing motor, or in the case of applicant's actuator illustrated by FIGURE 3, it can be said that there are two "electrical means" in that one "electrical means" is utilized to move the damper to say open position and another "electrical means" is used to move the damper to closed position. Looked at from this viewpoint, it can be seen that the present invention is applicable to either that type of actuator which has only one "electrical means" which when energized can be arranged to hold the damper in closed position or to the type actuator having two "electrical means" which are operated independently to move the damper to open or closed position as the case may be. The term "electrical means" in the following claims is therefore used with the foregoing in mind. More specifically, the term "first electrical means" is used in the claims to refer to an electrical means which tends to open the damper when energized, the term "second electrical means" refers to an electrical means which tends to close the damper when energized and the term "third electrical means" refers to a further independently operated electrical means which tends to close the damper when energized but not necessarily to the same position as in the case of the "second electrical means." This can be seen in that applicant provides closed positions for heating control determined by applicant's "second electrical means" which are independent of the closed positions for cooling control determined by applicant's "third electrical means."

In summary, an extremely versatile, simple and inexpensive combination heating and cooling temperature control is provided by the invention. Dissipation of residual conditioned air is assured. While generally applicable to conventional electrical damper actuators, the invention's greatest benefits are obtained with the type of unidirectional electrical damper motor actuator described having independently adjustable damper close positions for both heating and cooling.

Having described the invention, what is claimed is:

1. In a temperature control system selectively operable in heating or cooling condition for conditioning first and second zones, first zone and second zone dampers positionable to open and preset partially closed positions to control flow of heating and cooling medium to said respective zones; first and second electrical actuators for driving respectively said first and second dampers, each said actuator characterized by having first electrical means for causing its respective damper to occupy a first preset partially closed position for regulating flow of heating medium during heating operation and second electrical means for causing its respective damper to occupy a second preset partiallly closed position for regulating flow of cooling medium during cooling condition independent of said first position, and each of said actuators having other means operative when said electrical means are de-energized to cause said damper to be held in said open position; first and second zone temperature responsive switches; each having a demand and a satisfied condition; and electrical circuit control means responsive to said switches to activate said actuator means to cause both said dampers to occupy open positions when both said switches are in satisfied condition or in demand condition and responsive to only one of said switches assuming a demand condition to cause the damper for the zone associated with the non-demanding switch to occupy said first or second preset partially closed position correlated to the heating or cooling condition of the system.

2. In an air temperature control system as claimed in claim 1 wherein said actuators and electrical means each include a unidirectional motor driven disc connected to the respective damper and having conducting and non-conducting portions and wiper contacts engaging certain of said portions at certain predetermined positions of said damper whereby to control energization of the respective said actuator according to the position of its respective damper.

3. In an air temperature control system as claimed in claim 1 wherein said actuators and electrical means each include a unidirectional motor driven disc connected to the respective damper and having conducting and non-conducting portions, a first wiper contact constantly engaging said conducting portion, a second wiper contact corresponding to said first electrical means and adapted to establish a damper partially closing circuit through said disc and first contact by engaging said conducting portion at certain predetermined positions of said disc and a third wiper contact corresponding to said second electrical means and adapted to establish a damper partially closing circuit through said disc and first contact by engaging said conducting portion at certain other predetermined positions of said disc.

4. In an air temperature control system as claimed in claim 3, said disc including formations along the circumference thereof for terminating electrical conduction between said wiper contacts and said disc upon registration with said wiper contacts, and said actuators including means adjustably supporting siad second wiper contact and said third wiper contact for circumferential movement about the axis of said disc for adjustment of the circumferential positions of said second and third wiper contact to vary the positions at which the same register with said formation and thereby vary the first and second preset partially closed positions of the associated damper.

5. In an air cooling and heating temperature control system for a first and second zone, first zone and second zone dampers positionable to open and closed positions to control air flow to said respective zones; first and second electrical actuators for driving respectively said first and second dampers, each said actuator characterized by having first electrical means adapted when energized to cause its respective damper to be held in said open position, a second electrical means adapted when energized to cause its respective damper to be held in a first said closed position for heating control and a third electrical means adapted when energized to cause its respective damper to be held in a second said closed position for cooling control independent of the said first closed heating control position; first and second zone temperature responsive switches of the double throw type adapted for heating and cooling control; first and second relay switches having sets of contacts which are closed when the respective said temperature responsive switches are open and other open contacts which are dependent for closing on closing of the respective said temperature responsive switches; a third manually positionable selector switch for making said second and third electrical means alternatively operable for respective heating or cooling control; a voltage source; a series with said source said relay switches each having one set of closed contacts in series with said first actuator's first electrical means and another set of closed contacts in series with said second actuator's first electrical means, said first relay switch having in series with said source a further set of open contacts in series with said first actuator's first electric means and a set of closed contacts in series with said first actuator's second or third electrical means depending on the position of said selector switch, said second relay switch having in series with said source a further set of open contacts in series with said second actuator's first electrical means and a set of closed contacts in series with said second actuator's second or third electrical means depending on the position of said selector switch, whereby when said temperature responsive switches are both open or both closed said dampers are both held open and when only one of said temperature responsive switches is closed only the damper in the zone in which such temperature responsive switch is located is electrically held open and the damper in the opposite zone is electrically held closed at such said first or second closed position as corresponds to the heating or cooling position of said selector switch.

6. In an air cooling and heating temperature control system as claimed in claim 5 wherein said actuators and electrical means each include a unidirectional motor driven disc connected to the respective damper and having conducting and non-conducting portions and wiper contacts engaging certain of said portions at certain predetermined positions of said damper whereby to control the energization of the respective said actuator according to the position of its respective damper.

7. In an air temperature control system as claimed in claim 5 wherein said actuators and electrical means each include a unidirectional motor driven disc connected to the respective damper and having conducting and non-conducting portions, a first wiper contact constantly engaging said conducting portion, a second wiper contact corresponding to said first electrical means and adapted to establish a damper opening circuit through said disc and first contact by engaging said conducting portion at pretermined positions of said damper, a third wiper contact corresponding to said second electrical means and adapted to establish a damper closing circuit through said disc and first contact by engaging said conducting portion at predetermined positions of said damper and a fourth wiper contact corresponding to said third electrical means and adapted to establish a damper closing circuit through said disc and first contact by engaging said conducting portion at other predetermined positions of said damper.

8. In an air temperature control system as claimed in claim 7 wherein said third and fourth wiper contacts are independently adjustably positionable on said disc thereby enabling said heating and cooling closed positions to be changed independently by changing the positions of said third and fourth contacts.

9. In a temperature control system selectively operable in heating or cooling conditions for conditioning first and second zones, first zone and second zone dampers positionable to open and preset partially closed positions to control flow of heating and cooling medium to said respective zones; first and second electrical actuators for driving respectively said first and second dampers, each said actuator characterized by having first electrical means for causing its respective damper to occupy a first preset partially closed position for regulating flow of heating medium during heating operation and second electrical means for causing its respective damper to occupy a second preset partially closed position for regulating flow of cooling medium during cooling condition independent of said first position, and each of said actuators having other means operative when said electrical means are deenergized to cause said damper to occupy said open position; first and second zone temperature responsive switches; first and second switching means respectively dependent for energization on closing of said temperature responsive switches; a voltage source; said source, switching means and electrical means being arranged in predetermined closed and open circuits such that when said temperature responsive switches are both open or both closed said dampers are both held open and when only one of said temperature responsive switches is closed only the damper in the zone opposite to the zone in which such temperature responsive switch is located is caused to assume said first or second preset partially closed position correlated to operation of the system in heating or cooling condition.

10. In an air cooling and heating temperature control system for a first and second zone, first zone and second zone dampers positionable to open and closed positions to control air flow to said respective zones; first and second electrical actuators for driving respectively said first and second dampers, each said actuator characterized by having first electrical means adapted when energized to cause its respective damper to be held in said open position, second electrical means adapted when energized to cause its respective damper to be held in a said closed position for heating control, and a third electrical means adapted when energized to cause its respective damper to be held in a second said closed position for cooling control independent of the said first closed heating control position; first and second zone temperature responsive switches of the double throw type adapted for heating and cooling control; first and second switching means respectively dependent for energization on closing of said temperature responsive switches; a third manually positionable selector switching means for making said second and third electrical means alternatively operable for respective heating or cooling control; a voltage source; said source, first and second switching means and electrical means being arranged in predetermined closed and open circuits such that when said temperature responsive switches are both open or both closed said dampers are both electrically held open and when only one of said temperature responsive switches is closed only the damper in the zone in which such temperature responsive switch is located is electrically held open and the damper in the other zone is electrically held closed at such said first or second closed position as corresponds to the heating or cooling position of said third selector switching means.

11. In an air cooling and heating temperature control system as claimed in claim 13 wherein said actuators and electrical means each include a unidirectional motor driven disc connected to the respective damper and having conducting and non-conducting portions and wiper contacts engaging certain of said portions at certain predetermined positions of said damper whereby to control energization of the respective said actuator according to the position of its respective damper.

12. In an air cooling and heating temperature control system as claimed in claim 14 said disc including formations along the circumference thereof for terminating electrical conduction between said wiper contacts and said disc upon registration with said wiper contacts, and said actuators including means adjustably supporting certain of said second wiper contacts for circumferential movement about the axis of said disc for adjustment of the circumferential positions of the same to vary the positions at which the same register with said formation and thereby vary the first and second preset partially closed positions of the associated damper.

References Cited by the Examiner

UNITED STATES PATENTS

| | | | |
|---|---|---|---|
| 2,145,641 | 1/1939 | Baker | 236—11 |
| 2,244,631 | 6/1941 | Nessell | 236—9 |
| 2,271,487 | 1/1942 | Nessell | 236—9 |
| 3,214,099 | 10/1965 | Capps | 236—9 |

EDWARD J. MICHAEL, *Primary Examiner.*